A. L. CURRIER.
BUTTON MAKING MACHINE.
APPLICATION FILED JAN. 3, 1910.

1,120,908.

Patented Dec. 15, 1914.

7 SHEETS—SHEET 1.

Witnesses:
Edward Maxwell
M. J. Spalding

Inventor:
Arthur L. Currier,
by Geo. H. Maxwell,
Attorney.

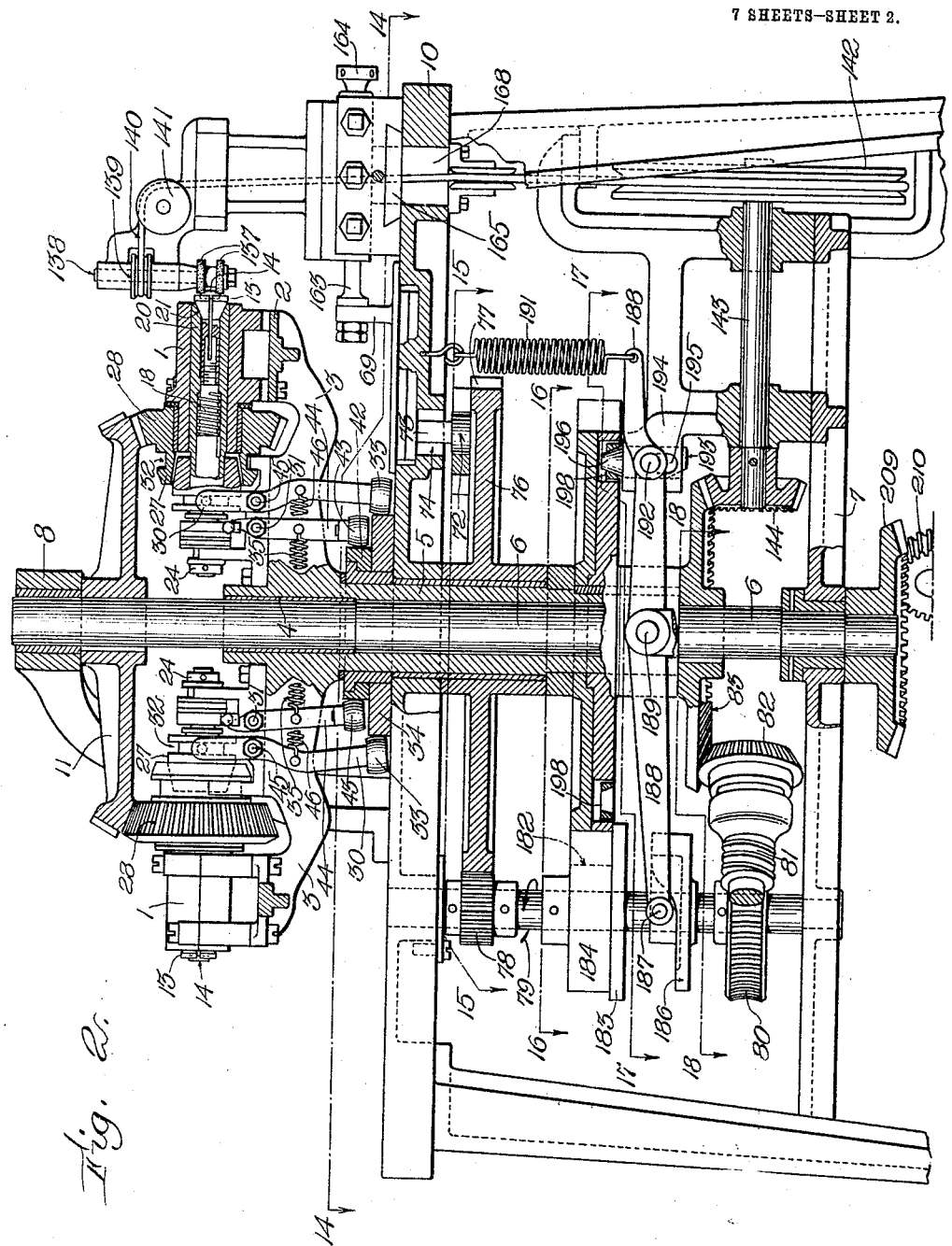

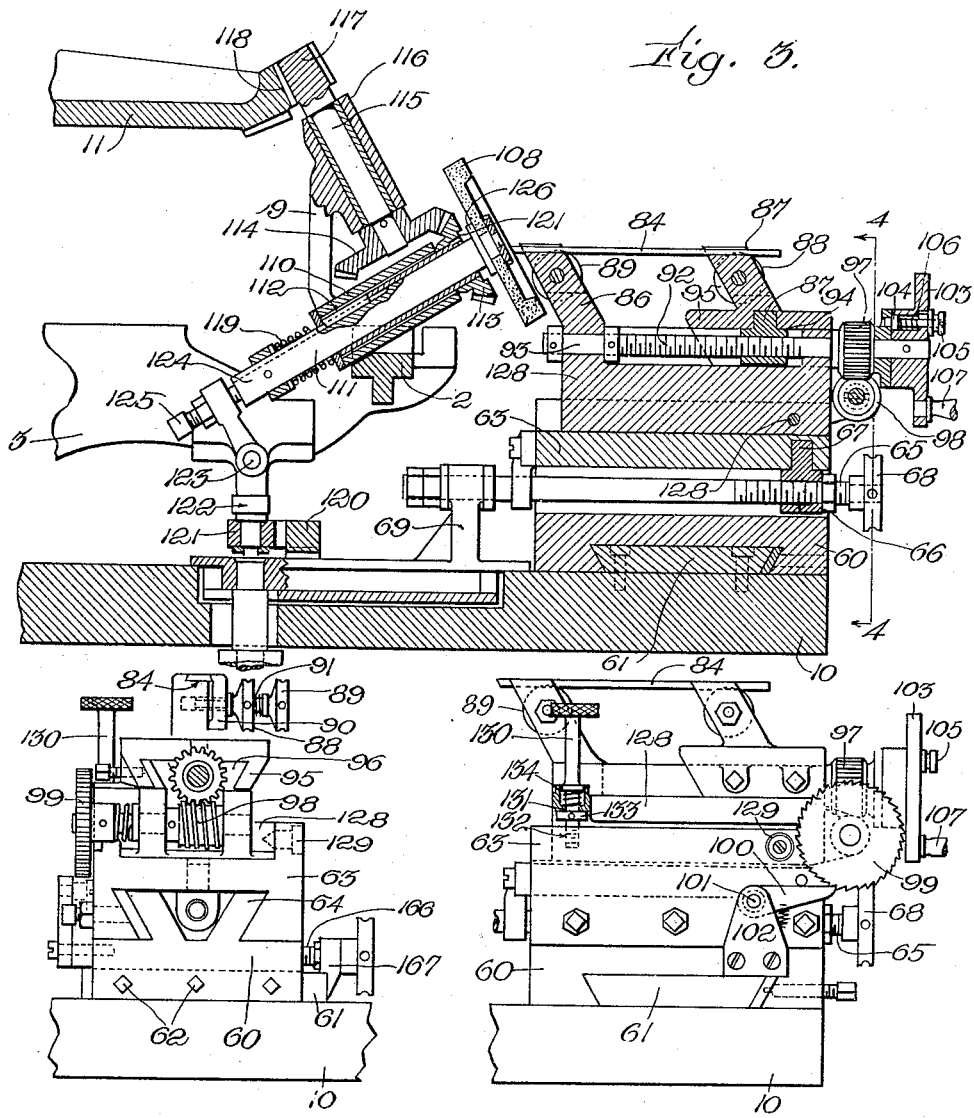

A. L. CURRIER.
BUTTON MAKING MACHINE.
APPLICATION FILED JAN. 3, 1910.

1,120,908.

Patented Dec. 15, 1914.

7 SHEETS—SHEET 4.

Witnesses:
Edward Maxwell
N. J. Spalding

Inventor.
Arthur L. Currier.
by Geo. W. Maxwell,
Attorney.

A. L. CURRIER.
BUTTON MAKING MACHINE.
APPLICATION FILED JAN. 3, 1910.
1,120,908.
Patented Dec. 15, 1914.
7 SHEETS—SHEET 5.
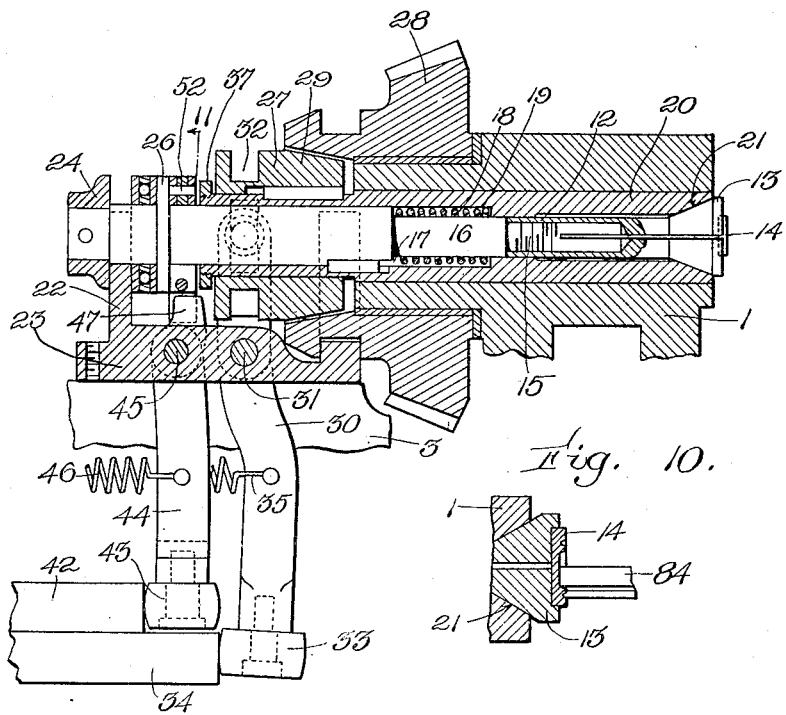
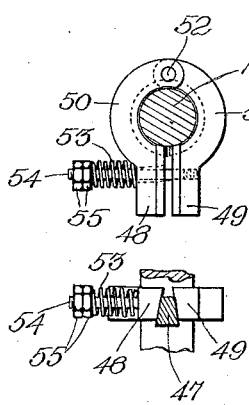
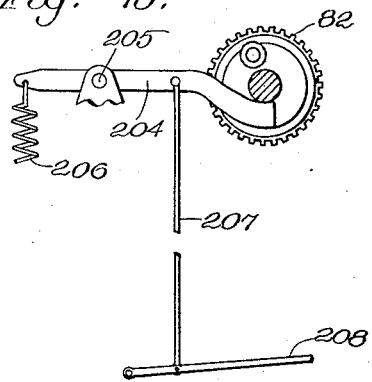
Witnesses:
Edward Maxwell
M. J. Spalding
Inventor:
Arthur L. Currier
by Geo. H. Maxwell,
Attorney.

A. L. CURRIER.
BUTTON MAKING MACHINE.
APPLICATION FILED JAN. 3, 1910.

1,120,908.

Patented Dec. 15, 1914.
7 SHEETS—SHEET 6.

Witnesses:
Edward Maxwell
M. J. Spalding

Inventor:
Arthur L. Currier,
by Geo. H. Maxwell,
Attorney.

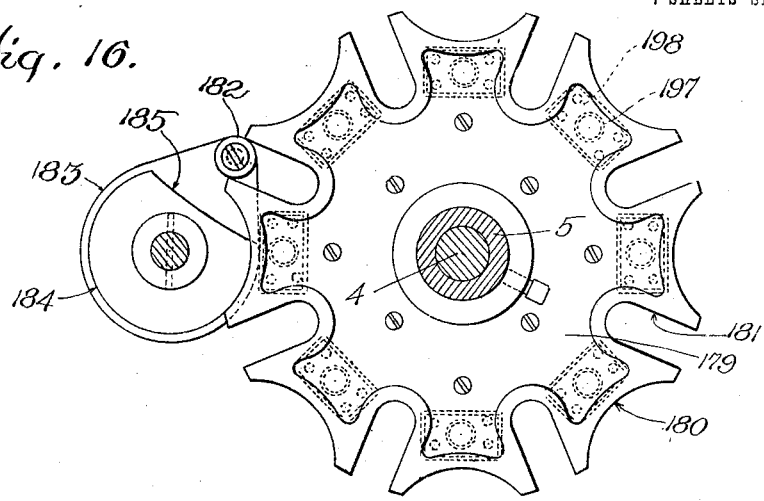
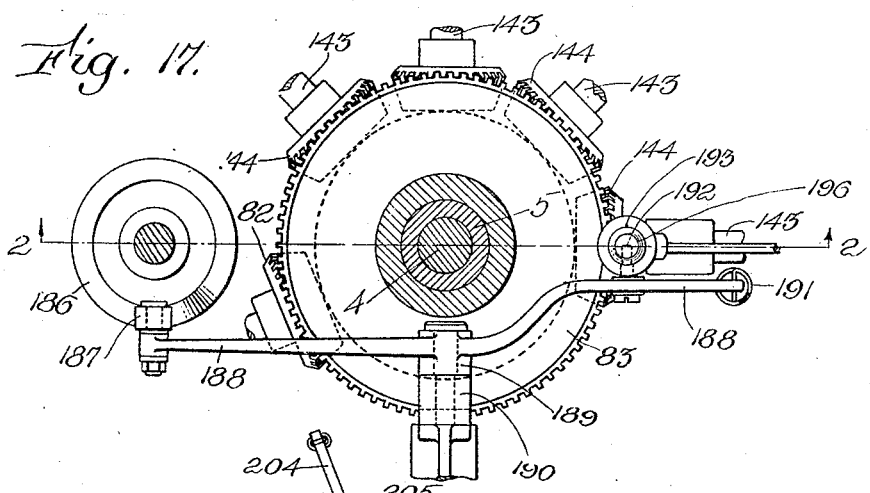
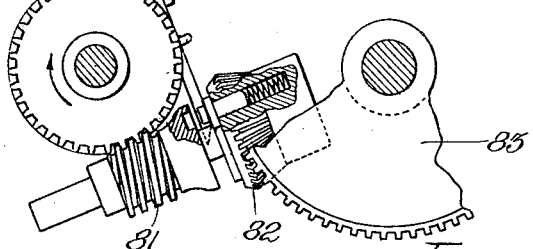

UNITED STATES PATENT OFFICE.

ARTHUR L. CURRIER, OF NEWTON HIGHLANDS, MASSACHUSETTS, ASSIGNOR TO THE J. W. MOORE MACHINE COMPANY, OF BOSTON, MASSACHUSETTS, A CORPORATION OF MASSACHUSETTS.

BUTTON-MAKING MACHINE.

1,120,908. Specification of Letters Patent. Patented Dec. 15, 1914.

Application filed January 3, 1910. Serial No. 536,137.

*To all whom it may concern:*

Be it known that I, ARTHUR L. CURRIER, a citizen of the United States, residing at Newton Highlands, in the county of Middlesex and State of Massachusetts, have invented an Improvement in Button-Making Machines, of which the following description, in connection with the accompanying drawings, is a specification, like letters on the drawings representing like parts.

My invention has for its primary object the production of greater speed, and accuracy and finish in the manufacture of pearl buttons.

The constructional details and further advantages of my invention will appear more at length from the following description taken in connection with the accompanying drawings, in which I have shown a preferred machine.

Figure 1:
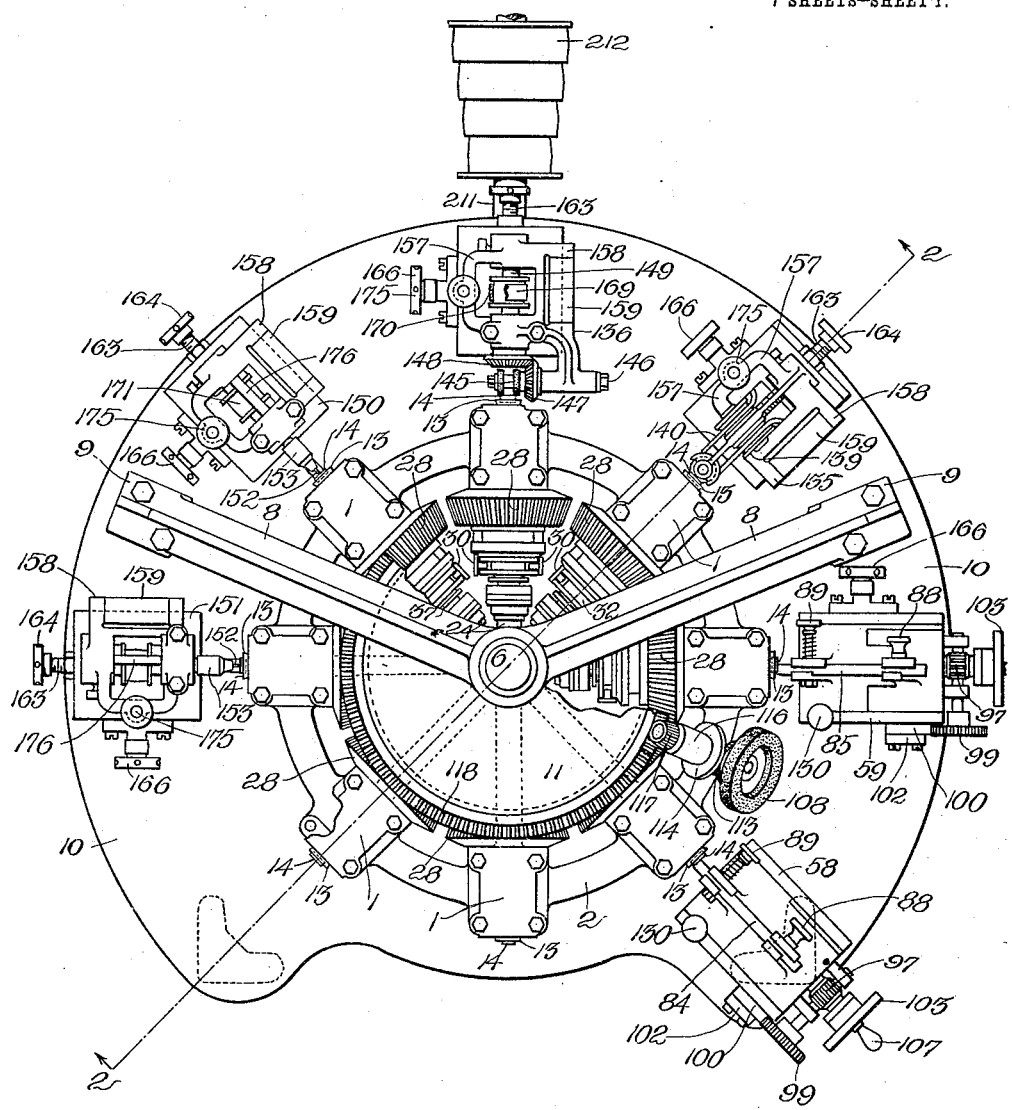
Figure 6:
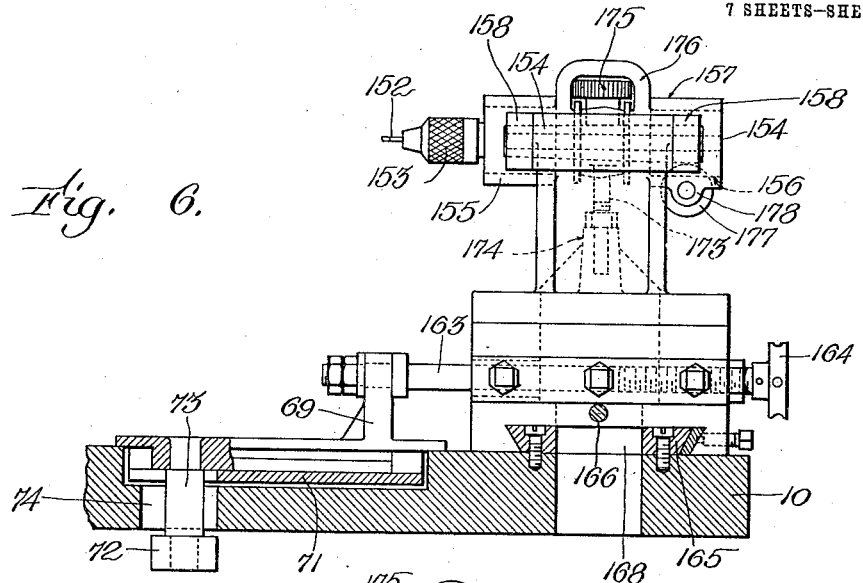
Figure 7:
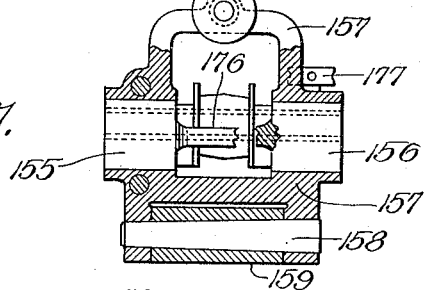
Figure 8:
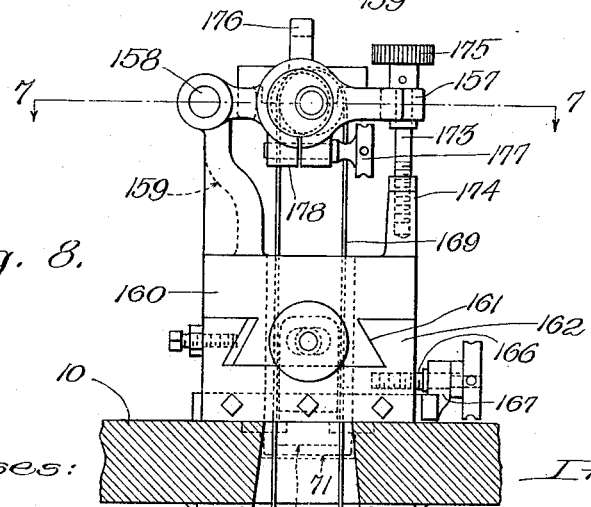
Figure 14:
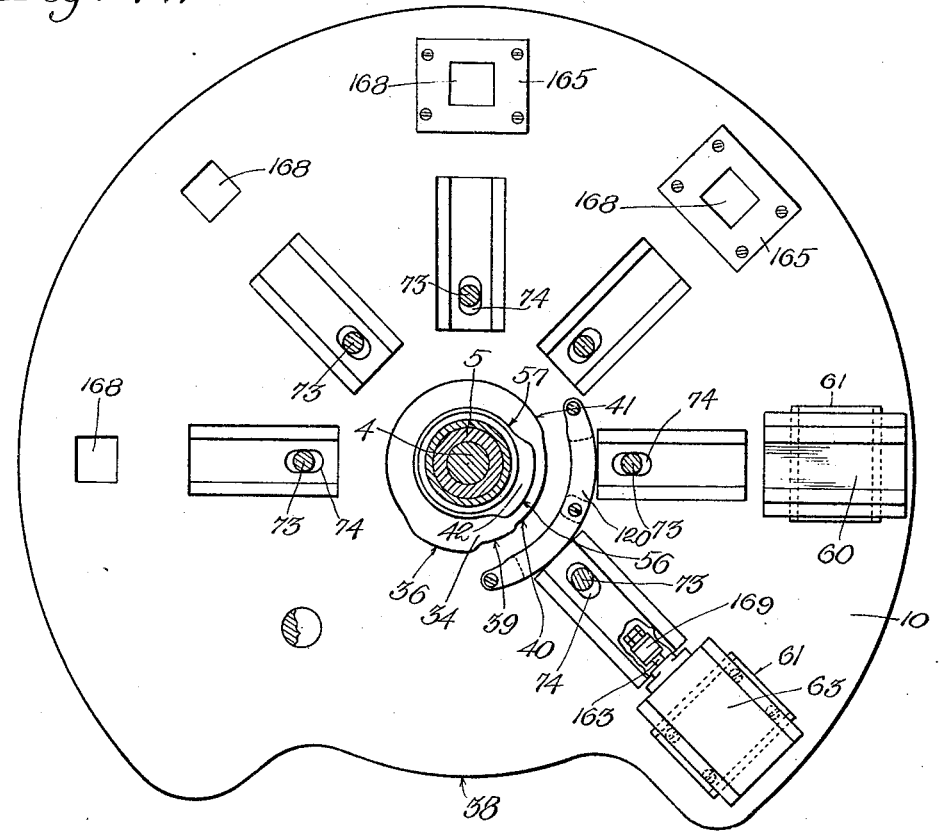
Figure 15:
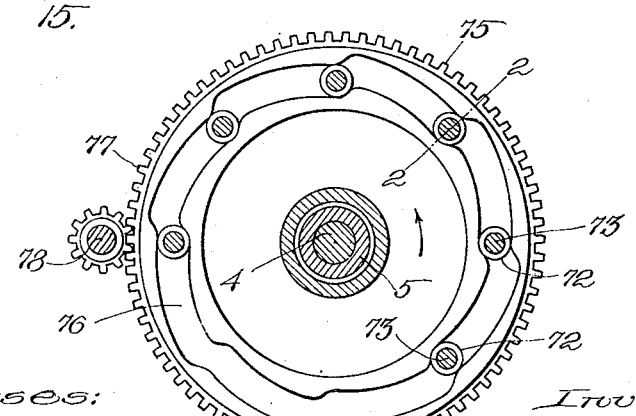

In the drawings, Figure 1 is a top plan view of the apparatus; Fig. 2 is a vertical sectional view on the line 2—2, Figs. 1 and 17; Fig. 3 is an enlarged detail of one of the forming tool heads and adjacent mechanism; Fig. 4 is a vertical sectional view on the line 4—4, Fig. 3; Fig. 5 is a view in side elevation looking at Fig. 4 from the left; Fig. 6 is a sectional view showing in side elevation one of the drilling heads; Fig. 7 is a horizontal sectional detail on the line 7—7, Fig. 8; Fig. 8 is a view looking at Fig. 6 from the right, the bed plate being in section; Fig. 9 is a vertical section of one of the work holders; Fig. 10 is an enlarged detail thereof showing a piece of work being operated upon when held by said work holder; Fig. 11 is a sectional detail at the point 11, Fig. 9; Fig. 12 is a broken plan view of Fig. 11; Fig. 13 is a sectional detail, partly broken away, showing the treadle and lever for operating the worm shaft of the machine; Fig. 14 is a horizontal sectional view on the line 14, Fig. 2, showing in top plan the bed of the machine; Fig. 15 is a similar sectional view on the line 15—15, Fig. 2, showing in top plan the gear cam; Fig. 16 is a horizontal sectional view on the line 16—16, Fig. 2, showing in top plan the Geneva movement of the mechanism; Fig. 17 is a horizontal sectional view on the line 17—17, Fig. 2, showing the driving mechanism for the drill heads; and Fig. 18 is a horizontal sectional view on the line 18—18, Fig. 2, showing the driving mechanism for driving the pinion shaft which operates the Geneva movement and the gear cam.

In the manufacture of shell buttons, there is great liability of breakage, which can be best overcome by avoiding all possibility of improper relative movement between the button-blank carrying part and the operating tool which works upon the shell material. In the machine shown, the chuck or holding device of the turret mechanism first stops at a convenient point, preferably directly in front of the operator, to receive the blank, which is placed in position preferably by hand. The chuck then moves in front of the roughing tool, where it stops. Thereupon the roughing tool roughly forms the blank and backs off. The chuck then moves forward to the next tool and stops, which finishes the forming operation, and thereafter the chuck moves step by step in front of successive fancy-pattern tools and hole-drilling tools, and finally to discharge position, remaining stationary at each point while being operated upon.

As herein shown, there are eight work-holders 1, all alike, for holding the blanks as they are carried successively forward to the successive tools to be operated upon, said work-holders being mounted on a spider-like carrier comprising a ring 2 and radial arms 3 extending from a hub 4 at the upper end of a sleeve 5 driven by the Geneva movement mechanism shown in Figs. 2, 16-18. This sleeve is mounted for convenience on a central or main drive shaft 6 journaled at its lower end in a cross bar 7 of the main frame and at its upper end in an overhanging yoke 8, which is secured at its opposite ends 9 to the main bed plate 10 of the machine. This shaft 6 carries at its upper end a bevel gear 11 which drives the work-carrying mechanism of each work-holder, and, as these are all alike, a description of one will suffice for all. Referring to Figs. 2, 9–12, it will be seen that I provide a chuck having a hollow shank 12 and split at its outer end into a plurality of gripping jaws 13 to hold a blank 14 as best shown in Fig. 10. Said shank is internally threaded and engaged by the threaded end 15 of a spindle 16 shouldered at 17 to receive the thrust of a spring 18 which bears at its opposite end against a shoulder 19 of an inclosing sleeve 20 splined to spindle 16. At its outer end the sleeve 20 is internally beveled at 21 to fit the correspondingly beveled or conical periphery of the chuck jaws 13 so that the normal position of the latter under the influence of said spring 18 is closed in gripping engagement with the work. To release the work or open the jaws to receive work, the requisite relative movement between the jaws 13 and the sleeve 20 is preferably accomplished by moving the sleeve, the spindle 16 being held at all times against endwise movement by a stationary fork or collar 22 extending upwardly from a block 23 secured to the adjacent arm 3 of the spider or carrier, which bears against an end collar 24 at one side and at its other side against a ball bearing 25 and flange 26 on said spindle. Splined on the sleeve 20 is a friction cone 27 for coupling the sleeve 20 and spindle 16 with their driving gear 28 which is driven by the gear 11 previously described, said gear 28 being provided with an internal conical driving surface 29 for receiving said cone 27. The latter is actuated by a forked lever 30 pivoted at 31 to the block 23 whose fork travels in a groove 32 of said cone, the opposite end of said lever 30 being provided with a cam roll 33 actuated by a cam 34 in opposition to a spring 35. The cam 34, see Fig. 14, is provided with a raised portion 36 which moves the cone 27 back against a collar or flange 37, Fig. 9, secured at the inner end of the sleeve 20 and thereby retracts the latter from the gripping jaws 13 so that the latter are permitted to open as the chuck arrives at the discharging position and remain open until after it leaves the starting position or front of the machine at 38, whereupon a slight depression 39 in said cam permits the cone 27 to move forward slightly from the collar 37 so that the spring 18 can close the work-holding chuck into gripping engagement with the work 14, and thereupon a depression 40 in said cam permits said cone 27 to move still farther forward, this time moving to its extreme forward position in driven engagement with the driving gear 28, which, as herein shown, continues to drive the work-holder while the work is at the first two stations or being operated upon by the first two tools. In other words, the work continues to be positively rotated by the gear 28 until the preliminary shaping or forming operation is completed. As soon as this forming operation has been completed and the work-holder has started to its next position, a raised cam surface 41 moves the cone 27 back out of driven engagement with the driving gear 28 in which position it is thereafter held until ready to be discharged. As it is necessary that the work shall remain in absolutely unchanged axial position while being operated upon at the remaining stations or halts in its travel, I provide a second stationary cam 42, roll 43 and lever 44 pivoted at 45 and actuated in opposition to said cam by a spring 46. This lever has a wedge-shaped upper end 47 to engage between the beveled ends 48, 49, Figs. 11 and 12, of friction clamps or jaws 50, 51 which embrace the spindle 16, being pivoted together at 52 above the same and held under tendency to clamp against the spindle by a sleeve spring 53 mounted on a bolt 54 and held under tension by nuts 55. Thus when the extended portion 56 of said cam 42 engages said lever 44, it operates to shove the wedge-end 47 in between the ends 48, 49 of the clamping jaws so that the latter are out of engagement with the spindle 16, but as soon as the work has passed the first two stations, the depressed portion 57 of said cam 42 permits said lever 44 to swing inwardly under the influence of its spring 44, thereby partly removing its wedge-end 47 from between said jaws 50, 51 so that the latter are held in gripping engagement with the spindle 16 by the spring 53, thereby preventing the button-blank from changing its axial position to the slightest extent while passing step by step to its succeeding positions. The jaws 50, 51, when in gripping engagement with the spindle 16 are held from dislocation by the wedge-end 47, which at this time still projects some little distance in between the ends 48, 49.

The work-holder first moves from the starting position to position to be rough-formed by the rough-forming mechanism at station 58 and then to position to be finished in form by the mechanism at station 59, and as the mechanisms at these two forming stations are both the same, a description of one will suffice for both. Referring to Figs. 3, 4, and 5, I have mounted on the bed 10 a base 60 adjustably clamped on a dovetail way 61 by set screws 62, and on this base is mounted a table 63 also preferably supported on a dovetail way 64 (shown as forming a part of the base 60) on which the table 63 is reciprocated by a screw rod 65 to which it is connected by a nut 66 whose tongue 67 engages said table. The rod 65 is preferably provided with an adjusting head 68 and is threaded into the nut 66 so as to permit relative adjustment between said rod and the table to bring the tool into accurate adjustment with relation to the work. The rod 65 is moved lengthwise by a carriage 69 whose T-shaped flange 70, best shown in Fig. 8, (which, although shown in connection with the drill head, is exactly the same for all the operating tools of whatever kind they may be) is guided in a recess in the bed and travels on an alining shoe 71, being actuated by a cam roll, 72 on the lower end of a stud 73 which depends rigidly from said carriage through a slot 74 in said bed. The cam roll 72 of each tool-reciprocating head is actuated by a path cam 75 in a cam 76 provided peripherally with gear teeth 77 in mesh with a pinion 78 fast on a vertical shaft 79 whose worm wheel 80 is driven by a worm 81 and beveled gears 82, 83 fast on the main shaft 6. The shape of the tools 84, 85 at the first and second stations, i. e. stations 58, 59, will conform to whatever general shape of button it is desired to make from the blank. The tool is mounted in two normally rigid arms 86, 87, the former being immovable with relation to its support 63 and the latter adjustable on said support in order to approach the arm 86 as the tool shortens in use and has to be moved forward. The tool is held in these two arms by set screws 88, 89 and clamping plates 90, as best shown in Fig. 4. The set screw 88 holds the rear end of the tool rigidly and immovably clamped, but a spring 91 coöperates with the forward set screw 89 in yieldingly clamping the forward end of said tool, so that as the rear arm 87 is fed forward step by step, the tool can move with relation to the front arm 86 although still held properly clamped thereby. This forward feeding of the tool is of considerable practical importance. I have found that one of the serious causes of breakage in the manufacture of pearl buttons is due to the dulling of the roughing tool and finishing tool, and also to some extent to the accumulation of chips on the work which wedge under the tool and against the work, tending to fracture the latter. Accordingly I have eliminated the accumulation of chips and dust on the work by standing the blank edgewise in the machine and arranging the tool to approach the same horizontally as distinguished from having the blank horizontal and the tool brought down onto it vertically, and I have eliminated the breakage due to the wearing of the tools to an imperfect cutting edge by providing the tools with a forward step-by-step movement, preferably automatic, which moves the tool forward an almost infinitesimal increment greater than the wear caused by a predetermined amount of cutting, and I move periodically in front of these cutting tools a sharpener which grinds off the tool to the extent of this small increment, so that the tools are not only kept sharp but are kept in absolutely true position with relation to the blanks. Preferably this forward feeding of the tools and sharpening thereof takes place once for every eight buttons made, although this in practice depends somewhat on the kind of button, button-stock, and tool. The step-by-step feeding movement is accomplished by a feed screw 92 mounted to rotate at 93 in the table or tool carriage 63 but held against longitudinal movement, said screw having threaded engagement with a depending lug or nut 94 fast on the under side of the base 95 of the movable arm 87 which travels on a dovetail 96 formed on the upper side of the tool carriage. At its outer end the feed screw 92 is provided with a worm gear 97 in mesh with a worm 98 whose shaft carries a ratchet 99 engaged by a pawl 100 pivoted at 101 on a stationary bracket or ear 102, so that each time the tool carriage 63 is reciprocated by the cam 75, the tool is fed forward the desired increment. To permit this feeding movement to be accomplished by hand whenever desired, a hand wheel 103 is pinned onto the outer end of the screw shaft 92 and provided with a locking bolt 104 for locking the worm gear 97 to said shaft and unlocking the same when the bolt is pulled out by its handle end 105 against its spring 106. The hand wheel has a handle or crank 107. While ordinarily the automatic feed of the tool is sufficient, the hand feed is desirable in case a bad place should develop in a tool or for any other reason it should become desirable to give the tool special attention.

The sharpening or truing device is preferably an emery wheel or any kind of grinding wheel 108, and is preferably mounted on the spider ring or turret ring 2 in a journal bracket 109, see Figs. 1 and 3. This bracket has two oblique bearings at right angles to each other, as herein shown, one bearing 110 in which the spindle 111 of the grinding wheel 108 is mounted within and keyed to a sleeve 112 which carries at its outer end a beveled gear 113 driven by a gear 114 on a shaft 115 journaled in the other oblique bearing 116 and carrying a pinion 117 at its outer end in mesh with the adjacent oblique peripheral gear teeth 118 of the driving gear 11, whereby the grinding wheel 108 is maintained in continuous rotation. The normal position of this grinding wheel is back, so as not to interfere with the succeeding tools at the subsequent stations, being held in its backward position by a spring 119 on the spindle 111 and moved forward at the required times for truing the roughing and finishing tools 84, 85 by a cam 120 fast on the bed plate 10 and engaged by a cam roll 121 at the lower end 122 of a lever pivoted at 123 whose upper end 124 is provided with an abutment screw 125 which bears against the lower end of the spindle 111 for moving it in opposition to its spring 119. This permits the utmost nicety of adjustment of the forward position of the truing or grinding wheel 108 whereby the latter is enabled to maintain absolute accuracy of grinding-edge position of the tools 84, 85. The spindle 111 is supported by the abutment screw 125 only when in grinding position, the wheel 108 having a flange 126 which seats in a recess 127 during the remaining travel of said mechanism. I secure still further accuracy of finish and avoidance of breakage by providing means for insuring that the cutting tool shall engage the blank at the one critical point necessary for the best work. I have found that there is always one point on the blank where the tool will cut to the best advantage, this point depending upon the pattern of the button, the tool, and the angle, and accordingly, to adjust the cutting edge of the tool accurately to this position, I have made the tool carriage 63 in two parts, consisting of a lower part or table which directly engages the dovetail 64, and an upper part 128 pivotally supported at its outer end on center screws 129, the other end of the part 128 being accurately adjustable toward and from the lower part of the carriage 63 by a hand operated post or thumb screw 130 mounted to turn at 131 in the upper part and tapped into the lower part at 132, see Fig. 5. To prevent backlash or chattering of the tool, I provide said post with a flange 133 and hold the upper part 128 continuously down hard upon said flange by a spring 134.

In making the ordinary pearl or shell buttons, the tools to which the button is subjected after it has been turned down and finished to the right shape by the mechanisms at stations 58, 59 are the drilling tools, usually two or more according to the kind of button. In this more complete embodiment of my invention, however, I have shown the machine arranged to make fancy-pattern buttons. After the general or preliminary shaping of the button at stations 58, 59, the work-holders carry the partially formed buttons to pattern shapers, herein shown as comprising two stations 135, 136. The particular kind of fancy-pattern tool shown at said stations is a grinder, which I have shown for the purpose of rendering this portion of my invention clearly understood, inasmuch as grinding tools are commonly used for making fancy patterns, but it will be understood that any other kind of pattern-tool suitable for the given kind of button being made may be used, and also it will be understood that the particular order of arrangement of the various tools and stations may be changed according to the requirements of the particular kind of button or the preferences of the individual factory or user. At station 135 I have shown the grinder as composed of two parallel horizontal emery wheels 137 mounted on a vertical spindle 138 whose pulley 139 is driven by a band or belt 140 passing over guide pulleys 141 to a driving pulley 142 mounted at the outer end of a shaft 143 whose pinion 144 meshes with the central driving gear 83, which serves to drive all the pinions 144, there being one for each station from 135 on, see Fig. 17. At the station 136 I have shown a similar grinder, excepting that its emery wheels 145 are mounted to turn in vertical planes on a horizontal spindle 146 whose beveled gear 147 is in mesh with a drive gear 148 on a shaft 149. This arrangement is for making what is called a "square-faced" pattern button. Of course any other pattern grinders or other kinds of tools may be substituted for the grinding means 137, 145 according to the kind of button, as for instance a fish-eye button would call simply for one central grinder to grind the "fish-eye", whereas a button with a checker-board face would call for a multiple-edge grinder at each place.

One of the commonest kind of buttons is shirt buttons, and these buttons are ordinarily sewed onto garments by means of button-sewing machines, and the frequent breakage of the buttons and of the needles of the sewing machines is due to the fact that the thread holes are not uniform and accurately spaced. Accordingly one of the chief aims of my invention is to provide mechanism which will insure the absolutely accurate and uniform spacing and formation of the thread holes or eyes of the buttons. This is accomplished mainly by the mechanism already described which moves the work to a definite position where it remains while being operated upon, and which clamps the button as soon as its shape has been finished at the second station or position 59 and holds said button and its spindle 16 and sleeve 20 immovably from that point until the final drilling has been finished. Two drill heads are herein shown, each operating a single drill at stations 150, 151. I have shown this simple form as the best means for rendering my invention clear as to this feature, but it will be understood that the number of drills, and whether each station has a single drill or not, and also the number of stations, will depend upon the button. As herein shown, I have provided for a two-hole or two-eye button, but buttons with four, six, and various numbers of holes may be provided for as already intimated. The drill heads are all alike (excepting that they are so positioned that their respective drills bore the respective holes in desired relation to each other in the button), and hence a description of one will suffice for all. Referring to Figs. 6—8, I have shown a drill 152 mounted in a drill chuck 153 at the end of a spindle 154 journaled in eccentric bearings 155, 156 mounted in a hanger 157 (this same hanger and accompanying parts being also a part of the construction of the pattern-tool heads at stations 135, 136, and hence similarly designated) pivoted at 158 on a wide standard 159 projecting upwardly from one side of a carrier 160 which is provided with a dovetail sliding engagement at 161 with a base 162 which corresponds to the base 60 of the previously described tool heads at stations 58, 59. A screw rod 163, which corresponds to the screw rod 65, is tapped directly in the carrier 160 and adjusted by an adjusting head 164. The base is mounted for lateral adjustment on a dovetail way 165 the same as the previously described way 61, adjustment being given in both instances by a screw 166 mounted to rotate in an up-turned end 167 of the adjacent dovetail way. The way 165 and the bed 10 and the superposed parts are cut out at 168 to provide a vertical opening for the driving belt 140 of the grinder at station 135 and a driving belt 169 at the following stations. This belt passes over a pulley 170 on the spindle 149 of the grinder at station 136. The belt 169 at the drill stations passes over a pulley 171 on the drill spindles 154. Said belt passes downwardly under guide pulleys 172 around a driving pulley 142 on a shaft 143 (as already described). The hanger 157 is mounted at its free end on a threaded post 173 vertically adjustable in a boss 174 by means of a hand wheel 175. This provides for a delicate vertical adjustment, which is especially important and serviceable in the case of the drills. In the drill heads, a transverse adjustment is provided by the eccentric bearings 155, 156 which, for this purpose, have a connecting handle 176 by which they may be rotated much or little according to the adjustment desired, and then immovably clamped by a clamping screw 177 which clamps together the ears 178. By reason of these various adjustments, each drill 152 is brought with perfect accuracy to the position required for drilling its hole in the button-blank.

The step-by-step movement of the turret mechanism or work-holders may be provided by any suitable means, the preferred mechanism, as already stated, being a Geneva movement, best shown in Figs. 2 and 16, where it will be seen that the sleeve 5 which carries the work-holding parts 1, 2, 3, 4 has keyed thereto a star wheel 179 whose dwells 180 and radial slots 181 coöperate with the pin 182 of a pin wheel 183 and its hub 184 having a usual cutaway side 185 next to said pin. The mechanism already described insures a high degree of accuracy, but to render the machine still more certain in positioning the work, I have provided, in addition to the Geneva movement and connected parts, a positive, automatically centering, lock for the turret or work-carrying head, said lock being herein shown as comprising a cam 186 fast on the shaft 79 which engages a roll 187 on one end of a locking lever 188 pivoted at 189 to a bracket or stationary part 190, said lever being normally held under tendency to move to locking position by a spring 191. Adjacent this spring the lever 188 is pivotally fastened by a stud 192 to a pin 193 having a snug guiding fit in a bracket 194. The wall of the hole or socket in which the pin 193 moves is vertically slotted at 195 to permit the stud 192 to have the requisite up and down movement with the lever 188, and the upper end of said pin is beveled or conical as indicated at 196 to fit a correspondingly beveled or conical seat 197 in the under side of the star wheel 179, one such seat being provided adjacent each dwell 180, as best shown in Fig. 16. These conical seats are preferably formed in hardened plates or bushings 198.

To enable the operator to stop the work-holding and carrying mechanism, or to hold it stationary longer than its natural timing, I provide a clutch mechanism in connection with the worm 81 and gear 82 of any usual or preferred kind, herein shown as consisting of a plunger 199 seated in a recess 200 in the gear 82 against a spring 201 and adapted to enter a recess 202 in the adjacent face of the worm 81, out of which it may be moved by the wedging end 203 of a clutch lever 204 pivoted at 205 and operated in opposition to a spring 206 by a treadle rod 207 and foot lever 208. By this means, the operator can position with extreme care any special blank, or adjust or replace any part, or bring any of the parts to convenient position for adjustment or other attention, and he can permit and watch the operation of any of the tools for a longer time than usual on any given piece of work, etc. Power is communicated to the drive shaft 6 by beveled gears 209 and 210 from a shaft 211 and stepped cone pulleys 212, Figs. 1 and 2.

In use, as the rotating turret carries the work holders around, the operator, at the front of the machine at 38, places a blank in the holding jaws 13 of each work holder as it stops in front of him, said jaws being open at this point under the action of the raised portion 36 of the cam 34. Having received a blank, the chuck is moved forward one step by the Geneva movement, the jaws closing against the blank under the action of the depression 39 in said cam 34 as soon as the machine starts. The blank and its holder halt in exactly correct position in front of the roughing tool at station 58, said position being made absolutely correct by the conical locking pin 193. The button blank is maintained in continuous rotation while being operated upon by the two shaping tools 84, 85, by the driving gear 28, which is coupled with the work holder by the agency of the cam 34. Thereupon the rough shaping tool 84, which has previously been adjusted to engage the work at exactly the critical point for best results, is fed forward automatically to accomplish the rough shaping of the blank. As the work holder is horizontal and the shaping tool engages the work in the same horizontal plane, the chips and dust cannot accumulate on the button but the latter is kept free and clean all the time, and because of this fact and also because there are no overhanging parts, the operator can watch the progress of the work at the cutting point at all times. As soon as the blank is rough shaped, the tool 84 moves back and the work moves forward one step, where it is halted in accurate position before the cutting tool 85, which operates thereon to accomplish the finish shaping operation in the same manner as the rough shaping was previously accomplished. Thereupon the turret moves forward one step to the next station, and meanwhile the rotation of the work holder is stopped and the work is positively clamped or held against rotation so that it cannot change its axial position in the slightest during the rest of its step-by-step travel. This is accomplished by the stationary cam 42 and the wedge-shaped end 47 of the lever 44. The shaped blank halts in front of the next station 135 long enough to permit the first pattern tool, a grinder 137 as herein shown, to produce its portion of the pattern on the face of the button. The work is then moved by the turret another step forward and again halted in front of the next station 136 while the pattern is completed by the grinders 145. The next forward movement of the blank brings it to station 150 in front of the first drill head, where the importance of the clamping of the blank in absolutely unvarying axial position becomes of the greatest importance. Because of this construction, all the buttons are drilled to exactly the same spacing and position of the holes, so that no breakage of buttons or of sewing machines can thereafter occur because of defective drilling. The successive drills having been originally adjusted to exactly correct position to drill their respective holes at the right distance apart and in the right position, by means of their eccentric bearings 155, 156, and pivoted hanger 157 and the shiftable carrier 160, the drill at station 150 is moved forward, thereby drilling the first thread hole through the button, and the button then moves forward to the next station 151. Here it is halted by the stopping action of the Geneva movement on the turret mechanism and is positively and accurately positioned by the conical ended locking pin 193, as before, and then the second drill moves forward and makes its thread hole. This completes the button, according to the style of button which has been herein used for the purpose of illustrating my invention. The next forward movement of the turret brings the completed button into position to be discharged, the gripping jaws of its holder being opened by the action of the raised portion 36 of the cam 34 just before the turret stops at the discharging position. Said cam maintains the jaws open while the turret moves forward and halts at position 38 to receive another blank. The foregoing operation takes place in connection with each of the work holders or chucks, so that six buttons are in process of making all the time.

Having described my invention, what I claim as new and desire to secure by Letters Patent is:

1. A button making machine comprising a blank carrying chuck, a rotatable carrier therefor, tools spaced along the path of said carrier, means for rotating the chuck when opposite certain of said tools and means for holding the chuck stationary when opposite other tools, having a stationary cam controller extending about the carrier axis.

2. A button making machine, comprising a blank-holding chuck, a rotatable carrier therefor, tools spaced along the path of said carrier, a driver for rotating said chuck when opposite certain of said tools, a lock to hold said chuck stationary when opposite other tools, a stationary cam controller extending about the carrier axis having connections to render said chuck driver intermittently active as aforesaid, and a second stationary cam controller extending about the carrier axis to render the lock active as aforesaid when the chuck driver is inactive, and vice versa.

3. A button making machine, comprising a series of blank holding chucks, a rotatable carrier therefor, tools spaced about the periphery of said carrier, disconnectible driving means for said chucks, individual locks for each chuck to hold the same from rotation, and plural stationary cam formations with separate lever connections to said driving means and to said locks for causing intermittent drive of the several tools while the locks are disengaged and for locking the several tools while the drive is disconnected.

4. A button making machine comprising a blank carrying chuck, means to intermittently impart driving impulse thereto, a lock for said chuck composed of clamping jaws normally urged against the chuck, a wedge mounted for movement to engage said jaws to open the same and release the chuck for rotation, and means to control said wedge for timed operation relative to the chuck driving means.

5. A button making machine comprising a holding chuck, a driver therefor, having a clutch connection and with a controller for operating the chuck intermittently, a lock for said chuck composed of spring urged clamping jaws, a wedge to control said locking jaws, and a cam device arranged in timed relation to said driver controller to hold said wedge inactive when said driving clutch is disengaged and to hold the wedge active when the driving clutch is engaged.

6. A button making machine comprising a series of blank holding chucks, a carrier turret therefor, tools adjacent said turret, a common driving means for said chucks with individual clutch connections thereto, individual locks for said chucks, each having a wedge actuator, and stationary cams, one for controlling the engagement of said clutch connections and the other for actuating said wedges to disengage said locks as the chucks are opposite certain tools and said cams being also arranged for disengaging said clutch connections and engaging said locks as the chucks are opposite other tools.

7. A machine for making buttons, comprising a blank-carrier, means to move said carrier and the blank carried thereby step by step into position for the blank to be operated upon by successive tools, relatively stationary tool carriages provided respectively with tools for giving the button successive portions of its finished shape and structure, including an edged shaping tool, automatic means for relatively moving the button-blank and tool toward each other to a definite extent, and means movable with said blank-carrier for automatically sharpening and truing the edge of said tool to a predetermined length with relation to said cutting movement, whereby the cut surface of successive blanks is maintained uniform.

8. A machine for making buttons, comprising a blank-carrier, means to move said carrier and the blank carried thereby step by step into position for the blank to be operated upon by successive tools, relatively stationary tool carriages provided respectively with tools for giving the button successive portions of its finished shape and structure, including an edged shaping tool, automatic means for relatively moving the button-blank and tool toward each other to a definite extent, and means movable with said blank carrier for automatically sharpening and truing the edge of said tool to a predetermined length with relation to said cutting movement, whereby the cut surface of successive blanks is maintained uniform, including automatic means for giving said tool a slight increment of forward movement at each sharpening and truing operation.

9. A button making machine comprising blank holding chucks, a carrier turret therefor, tools spaced about the periphery of said turret and mounted for radial movement, means for intermittently advancing said turret step by step, and a rotatable cam having connections to simultaneously control the several tools, said cam having also geared connection with said turret advancing means.

10. A button-making machine, comprising a blank-carrying turret, a series of tools having in and out movement extending radially about the periphery of said turret, and a cam rotatably mounted concentric with the turret axis, said cam having individual connections with the separate tools for simultaneously controlling the in and out movement of said tools.

11. A button making machine comprising a series of rotatable chucks, a carrying turret therefor, button making tools arranged around the periphery of said turret and mounted for radial movement, means for rotating said chucks when opposite certain tools, means for locking the chucks when opposite other tools, stationary cam formations about the turret axis for controlling said chuck rotating and locking means and a cam rotatable concentric with said turret and having connections to simultaneously control the radial movement of the several tools.

12. A button making machine comprising a blank carrying turret, a series of tools arranged about the periphery thereof and mounted for in and out movement, a cam mounted to rotate concentrically with the turret having connections to simultaneously control the several tools, means for rotating said cam and means in geared connection therewith for rotating the turret step by step.

13. A button making machine comprising a blank carrier, means to move said carrier step by step into position for the blank to be operated upon by successive tools, relatively stationary tool holders having tools for operating on the blank, and a sharpening and truing device carried by the blank carrier in position to operate on one or more tools in the progress of the blank carrier.

14. A button making machine comprising a blank carrier, means to move said carrier step by step, tools arranged along the path of said carrier, a tool sharpening and truing device carried by said carrier, means for holding said device normally in inactive position and means for advancing said device to active position when opposite a particular tool station or stations.

15. A button making machine comprising a blank carrier, means to move said carrier step by step, tools arranged along the path of said carrier, a tool sharpening and truing device carried by said carrier, means for holding said device normally in inactive position, a relatively stationary cam formation having connections to advance said device when opposite a certain tool or tools to active position and an adjustment in said connections to determine such active position.

16. A button making machine comprising a blank carrier, a tool holder carrying a tool adjacent thereto, having a forward yielding clamp holder to support the tool near its operative portion and a rearward fixed clamp support, and means for feeding said rearward clamp support to advance the tool by small stages.

17. A button-making machine, comprising a button-holding chuck, means to rotate said chuck, said chuck having gripping jaws fixed against endwise movement, an endwise movable sleeve for controlling the gripping action of said jaws, an interposed spring normally urging said sleeve toward jaw-gripping position, said rotating means including a clutch member mounted on said endwise movable sleeve, the parts being arranged so that by an initial movement of an operating device the gripping jaws are first closed and a further movement transmits driving connection to said chuck, and said operating device.

18. A button-making machine, comprising a blank-carrier, means to rotate it step by step, a chuck mounted thereon, means to rotate said chuck with relation to said carrier, said chuck having gripping jaws fixed lengthwise relative to said carrier, a movable sleeve directly engageable with said jaws and having means coöperative therewith to hold the jaws normally closed, said chuck-rotating means including a clutch member mounted on said movable sleeve, a fixed cam, and means operable by said cam for controlling the movement of said clutch and of said sleeve to cause the jaws to grip the work and be driven in certain positions of the carrier and to open and be disengaged from driving connection in other positions of said carrier.

19. In a machine for making buttons, a blank carrier provided with a horizontal holder for holding a blank vertically edgewise in position to be operated upon, a plurality of tools for successively engaging said blank to make the button, including spaced apart horizontal grinders mounted on a common vertical axis, and actuating means to rotate said grinders.

20. In a machine for making buttons, a blank carrier provided with a horizontal holder for holding a blank vertically edgewise in position to be operated upon, a plurality of tools for successively engaging said blank to make the button, including spaced apart vertical grinders mounted on a common horizontal axis, and actuating means to rotate said grinders.

21. A machine for making buttons, a blank carrier provided with a holder for holding a blank in position to be operated upon, and a plurality of drills and their rotating mechanism, an adjustable pivoted support for each drill, a rotary bearing in said support in which the drill is eccentrically mounted, means for swinging said support on its pivot, and adjusting means for rotating said bearing in said support, whereby each drill may be brought accurately to the desired position for drilling a thread-eye in the button.

In testimony whereof, I have signed my name to this specification, in the presence of two subscribing witnesses.

ARTHUR L. CURRIER.

Witnesses:
JOSEPH W. MOORE,
PLUMMER C. SPRING.

Copies of this patent may be obtained for five cents each, by addressing the "Commissioner of Patents, Washington, D. C."